(12) United States Patent
Liang et al.

(10) Patent No.: US 9,155,142 B2
(45) Date of Patent: Oct. 6, 2015

(54) LED DRIVER CIRCUIT

(71) Applicant: MEMCHIP TECHNOLOGY CO., LTD., Hsinchu (TW)

(72) Inventors: Wei-Chen Liang, Baoshan Township, Hsinchu County (TW); Fu-Hsing Hou, Toufen Township, Miaoli County (TW)

(73) Assignee: MEMCHIP TECHNOLOGY CO., LTD., Hsinchu (TW)

( * ) Notice: Subject to any disclaimer, the term of this patent is extended or adjusted under 35 U.S.C. 154(b) by 300 days.

(21) Appl. No.: 13/857,241

(22) Filed: Apr. 5, 2013

(65) Prior Publication Data
US 2013/0271023 A1    Oct. 17, 2013

(30) Foreign Application Priority Data

Apr. 11, 2012  (TW) .............................. 101112703 A (51) Int. Cl.
  *H05B 37/02*  (2006.01)
  *H05B 33/08*  (2006.01)
(52) U.S. Cl.
  CPC ........ *H05B 33/0815* (2013.01); *H05B 33/0812* (2013.01); *Y02B 20/343* (2013.01)

(58) Field of Classification Search
None
See application file for complete search history.

(56) References Cited

U.S. PATENT DOCUMENTS 7,755,297 B2 *  7/2010  Lee et al. .................... 315/224
8,115,422 B2 *  2/2012  Sasaki ......................... 315/308

\* cited by examiner

*Primary Examiner* — Long Nguyen
(74) *Attorney, Agent, or Firm* — Bacon & Thomas, PLLC (57) ABSTRACT

The present invention is to provide an LED driver circuit which includes a capacitor and at least one LED respectively connected in parallel to a power source through a switch device, and a controller having an input end connected to a line between the switch device and the power source and being configured for detecting an input voltage applied to the LED. When the controller detected that the input voltage is unable to drive the LED to emit light, the controller activates the switch device to make only the connection between the capacitor and the at least one LED, such that the capacitor discharges a voltage stored therein to the at least one LED to continuously emit light. Since the driver circuit only needs a small-capacity, low-cost capacitor for increasing the light emission time of the at least one LED, the cost of the driver circuit can be lowered effectively.

3 Claims, 7 Drawing Sheets

LED DRIVER CIRCUIT

FIELD OF THE INVENTION

The present invention relates to an LED driver circuit, more particularly to an LED driver circuit having a controller to detect a voltage or current applied to the LED and capable of enabling a capacitor to discharge a voltage stored therein to the LED for continuously emitting light when the controller detected that the voltage or current can't drive the LED to emit light.

BACKGROUND OF THE INVENTION

Light-emitting diodes (LEDs) are light-emitting elements made of semiconductor materials whose properties enable conversion from electric energy into light energy. LEDs have been massively used in lighting- and display-related applications due to their small physical volumes, long lifetimes, low driving voltages, short response times, and ready adaptability to various products in our daily lives.

Figure 1:
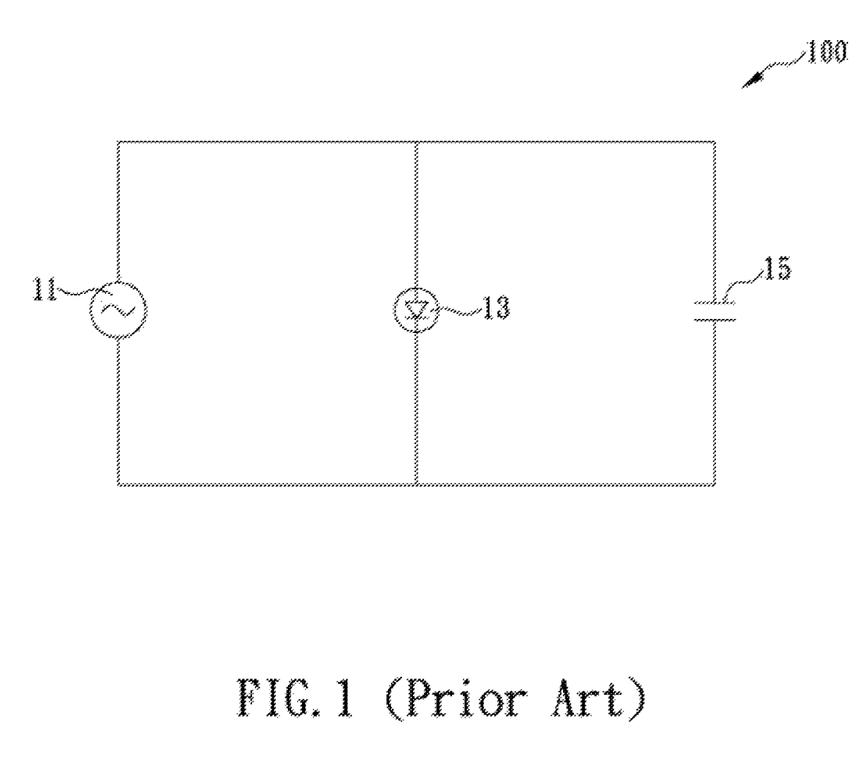
FIG. 1 schematically shows the circuit structure of a conventional LED driver circuit.

FIG. 1 schematically shows the circuit structure of a conventional simple LED driver circuit 100, which includes a power source 11 and at least one LED 13. The power source 11 can generate a pulsed direct-current (DC) voltage for driving the LED 13.

Figure 2:
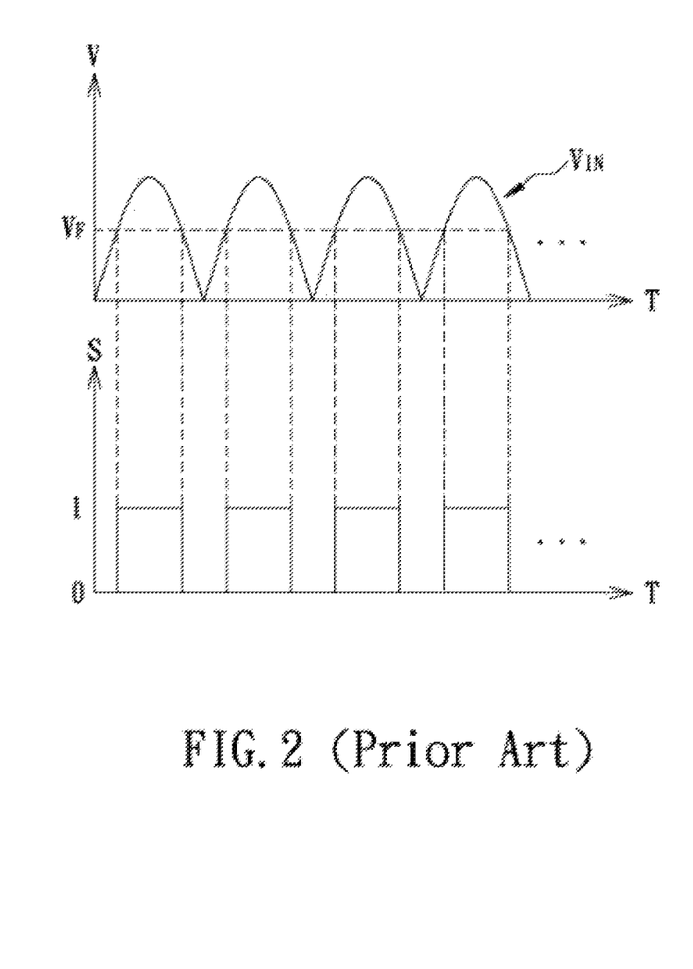
FIG. 2 shows the waveform diagram of a conventional input voltage and the states of a corresponding LED in relation to time.

Referring to FIG. 1 and FIG. 2, the input voltage $V_{IN}$ generated by the power source 11 varies periodically over time. When the input voltage $V_{IN}$ is higher than the forward bias voltage $V_F$ of the LED 13, the LED 13 can be successfully driven to emit light by the power source 11, as in the state of S=1 in FIG. 2. When the input voltage $V_{IN}$ is lower than the forward bias voltage $V_F$ of the LED 13, however, the LED 13 cannot be driven to emit light by the power source 11, as in the state of S=0 in FIG. 2.

Figure 3:
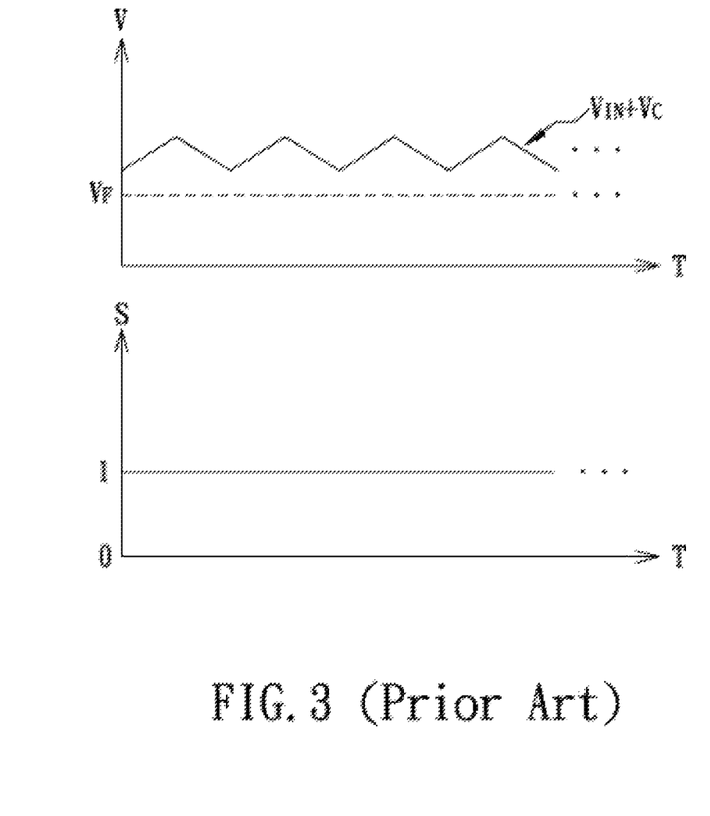
FIG. 3 shows the waveform diagram of a conventional ripple voltage and the state of a corresponding LED in relation to time.

Referring to FIG. 1 and FIG. 3, in order for the LED 13 to emit light continuously, one conventional approach is to add a capacitor 15 to the LED driver circuit 100. The capacitor 15 is charged by the power source 11 and thus stores a stored electric energy $V_C$ while the power source 11 is driving the LED 13. Therefore, the power supplied from the LED driver circuit 100 to the LED 13 will be a ripple voltage, which is the sum of the input voltage $V_{IN}$ and the stored electric energy $V_C$ (i.e., $V_{IN}+V_C$) and which can keep the LED 13 emitting light, as in the state of S=1 in FIG. 3.

However, despite the fact that the LED driver circuit 100 with the additional capacitor 15 can drive the LED 13 to emit light continuously, the aforesaid circuit design entails a waste of energy, for the capacitor 15 will keep discharging even when the power source 11 is at a relatively high potential level (e.g., when the input voltage $V_{IN}$ is higher than the forward bias voltage $V_F$ of the LED 13).

Moreover, in order to provide a sufficient driving power to the LED 13 incessantly, the ripple voltage ($V_{IN}+V_C$) must maintain at a relatively high level for a long time, and this cannot be done without a large-capacity capacitor 15 for energy storage. Nevertheless, as a large-capacity capacitor 15 generally can only be implemented by an electrolytic capacitor, which is both costly and prone to damage, the resultant LED driver circuit 100 will have a high circuit cost and less-than-satisfactory quality.

BRIEF SUMMARY OF THE INVENTION

In view of the fact that a conventional LED driver circuit requires a large-capacity capacitor in order to enable sustained emission of light from the LED(s) to be driven, the inventor of the present invention put years of practical experience into extensive research and experiment and finally succeeded in developing an LED driver circuit in which a capacitor is controlled by a switch and will not be discharged to an LED unless the input voltage is relatively low. The present invention provides a circuit arrangement in which a small-capacity, low-cost capacitor will suffice to effectively increase the light emission time of an LED.

It is an object of the present invention to provide an LED driver circuit which includes a controller, a switch device, a capacitor, and at least one LED. The capacitor and the at least one LED are respectively connected in parallel to a power source through the switch device. The controller has an input end connected to a line between the switch device and the power source and is configured for detecting an input voltage of the power source. When determining that the input voltage is higher than the forward bias voltage of the at least one LED, the controller generates a first control signal and sends the first control signal to the switch device through the output end of the controller, causing the switch device to make both the connection between the power source and the capacitor and the connection between the power source and the at least one LED, so as for the input voltage to not only drive the at least one LED to emit light, but also charge the capacitor simultaneously. Conversely, when determining that the input voltage is lower than the forward bias voltage of the at least one LED, the controller generates a second control signal and sends the second control signal to the switch device through the output end of the controller, causing the switch device to make only the connection between the capacitor and the at least one LED, so as for a discharge voltage of the capacitor to drive the at least one LED to emit light. Thus, the driver circuit only needs a small-capacity, low-cost capacitor in order to increase the light emission time of the at least one LED effectively, and the circuit cost of the driver circuit can be lowered.

Another object of the present invention is to provide yet another LED driver circuit, which also includes at least one LED, a capacitor, a switch device, and a controller. The capacitor and the at least one LED are respectively connected in parallel to a power source through the switch device. The controller has an input end connected to the switch device and is configured for detecting a load current in the switch device. When determining that the load current is higher than a rated current value, the controller generates a first control signal and sends the first control signal to the switch device through the output end of the controller, causing the switch device to make both the connection between the power source and the capacitor and the connection between the power source and the at least one LED, so as for an input voltage provided by the power source to not only drive the at least one LED to emit light, but also charge the capacitor simultaneously. When determining that the load current is lower than the rated current value, the controller generates a second control signal and sends the second control signal to the switch device through the output end, causing the switch device to make only the connection between the capacitor and the at least one LED, so as for a discharge voltage of the capacitor to drive the at least one LED to emit light.

Still another object of the present invention is to provide yet another LED driver circuit, wherein the LED driver circuit includes at least one LED, a capacitor, a first switch device, a second switch device, and a controller. The positive electrode of the capacitor and an LED are respectively connected to the positive electrode of a power source through the first switch device. The first switch device is configured to prevent a discharge current of the capacitor from flowing back to the power source and to ensure that the discharge current flows to the at least one LED. The negative electrode of the capacitor and an LED are respectively connected to the negative electrode of the power source through the second switch device. The controller has an input end connected to a line between the first switch device and the positive electrode of the power source and is configured for detecting an input voltage provided by the power source. When determining that the input voltage is higher than the forward bias voltage of the at least one LED, the controller generates a first control signal and sends the first control signal to the second switch device through the output end of the controller, causing the second switch device to make both the connection between the power source and the capacitor and the connection between the power source and the at least one LED, so as for the input voltage to not only drive the at least one LED to emit light, but also charge the capacitor simultaneously. When determining that the input voltage is lower than the forward bias voltage of the at least one LED, the controller generates a second control signal and sends the second control signal to the second switch device through the output end, causing the second switch device to make only the connection between the capacitor and the at least one LED, so as for a discharge voltage of the capacitor to drive the at least one LED to emit light.

Yet another object of the present invention is to provide still another LED driver circuit, which also includes at least one LED, a capacitor, a first switch device, a second switch device, and a controller. The positive electrode of the capacitor and an LED are respectively connected to the positive electrode of a power source through the first switch device. The first switch device is configured to prevent a discharge current of the capacitor from flowing back to the power source and to ensure that the discharge current flows to the at least one LED. The negative electrode of the capacitor and an LED are respectively connected to the negative electrode of the power source through the second switch device. The controller has an input end connected to the second switch device and is configured for detecting a load current in the second switch device. When determining that the load current is higher than a rated current value, the controller generates a first control signal and sends the first control signal to the second switch device through the output end of the controller, causing the second switch device to make both the connection between the power source and the capacitor and the connection between the power source and the at least one LED, so as for an input voltage provided by the power source to not only drive the at least one LED to emit light, but also charge the capacitor simultaneously. When determining that the load current is lower than the rated current value, the controller generates a second control signal and sends the second control signal to the second switch device through the output end, causing the second switch device to make only the connection between the capacitor and the at least one LED, so as for a discharge voltage of the capacitor to drive the at least one LED to emit light.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 4:
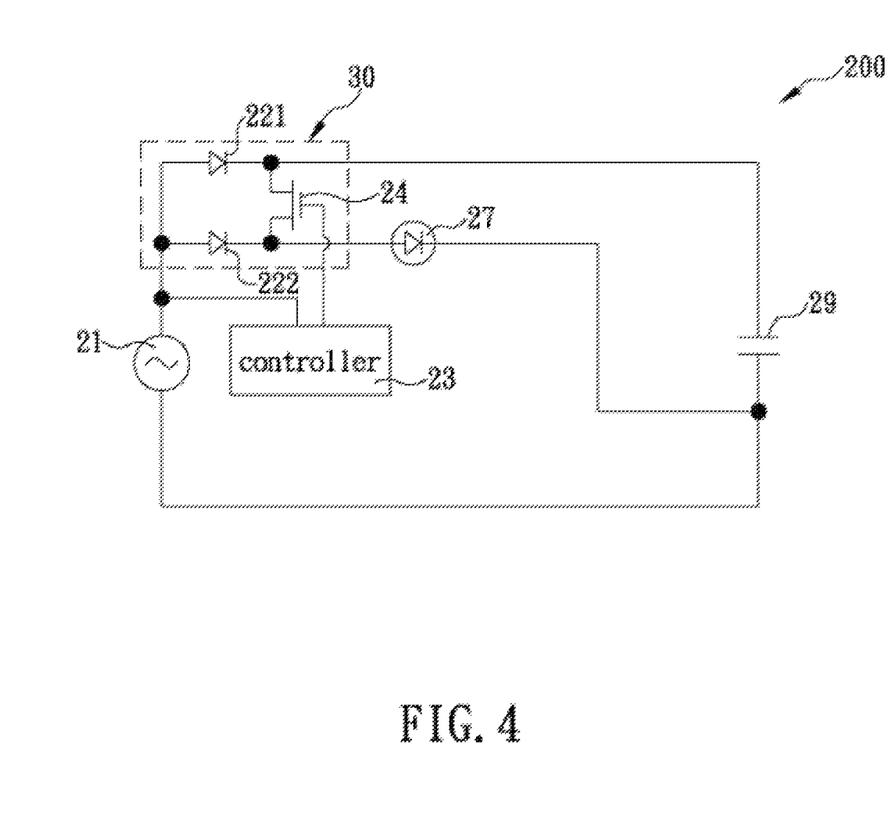
FIG. 4 schematically shows the circuit structure of the LED driver circuit according to a preferred embodiment of the present invention.

Please refer to FIG. 4 for a schematic circuit diagram of the LED driver circuit according to a preferred embodiment of the present invention. As shown in the drawing, the LED driver circuit 200 in this embodiment includes a power source 21, a controller 23, a switch device 30, at least one LED 27, and a capacitor 29.

The power source 21 can provide a DC input voltage. The capacitor 29 and the LED 27 are respectively connected in parallel to the power source 21 via the switch device 30. The input end of the controller 23 is connected to a line between the switch device 30 and the power source 21 in order for the controller 23 to detect an input voltage provided by the power source 21. Upon determining that the input voltage is higher than the forward bias voltage of the LED 27, the controller 23 generates a first control signal and sends the first control signal to the switch device 30 via the output end of the controller 23. Thus, the switch device 30 is driven to make the connection between the power source 21 and the capacitor 29 and the connection between the power source 21 and the LED 27, so as for the input voltage to not only drive the LED 27 to emit light, but also charge the capacitor 29 at the same time.

Conversely, upon determining that the input voltage is lower than the forward bias voltage of the LED 27, the controller 23 generates a second control signal and sends the second control signal to the switch device 30 via the output end of the controller 23. Thus, the switch device 30 is driven to make only the connection between the capacitor 29 and the LED 27, so as for the discharge voltage of the capacitor 29 to drive the LED 27 to emit light. Therefore, the LED driver circuit 200 only needs to be provided with a small-capacity, low-cost capacitor 29, and the light emission time of the LED 27 can be effectively increased at a low circuit cost.

Referring again to FIG. 4, in the first preferred embodiment of the present invention, the switch device 30 includes a first diode 221, a second diode 222, and a transistor switch 24. The positive electrodes of the first and the second diodes 221, 222 are connected to the positive electrode of the power source 21. The input end and the output end of the transistor switch 24 are respectively connected to the negative electrodes of the two diodes 221, 222. When the control end of the transistor switch 24 receives the first control signal, the transistor switch 24 cuts off the current between its input end and output end. When the control end of the transistor switch 24 receives the second control signal, the transistor switch 24 allows passage of current between its input end and output end.

It should be pointed out that, in the first preferred embodiment of the present invention as shown in FIG. 4, the transistor switch 24 is an N-type metal-oxide-semiconductor field-effect transistor (MOSFET), whose gate is the control end of the transistor switch 24 and whose drain and source are the input end and the output end of the transistor switch 24 respectively. Nevertheless, the transistor switch 24 may also be a P-type MOSFET or a bipolar junction transistor (BJT). When a P-type MOSFET is used, its gate functions as the control end, and its source and drain function as the input end and the output end respectively. When an NPN-type BJT is used, its base is the control end, and its collector and emitter are the input end and the output end respectively. In other words, the terms "input end" and "output end" merely indicate the current directions in the switch device 30 and may be adjusted in practice according to the material properties of the transistor used.

As the LED driver circuit 200 of the present invention is so configured that only when the input voltage generated by the power source 21 is lower than the forward bias voltage of the LED 27 will the switch device 30 make the connection between the capacitor 29 and the LED 27 under the control of the controller 23, thus allowing the fully charged capacitor 29 to drive the LED 27 to emit light, continuous light emission by the LED 27 can be achieved with a small-capacity, low-cost capacitor (e.g., a capacitor with a solid electrolyte) serving as the capacitor 29. Thus, the circuit cost of the driver circuit 200 will also be significantly reduced.

Figure 5:
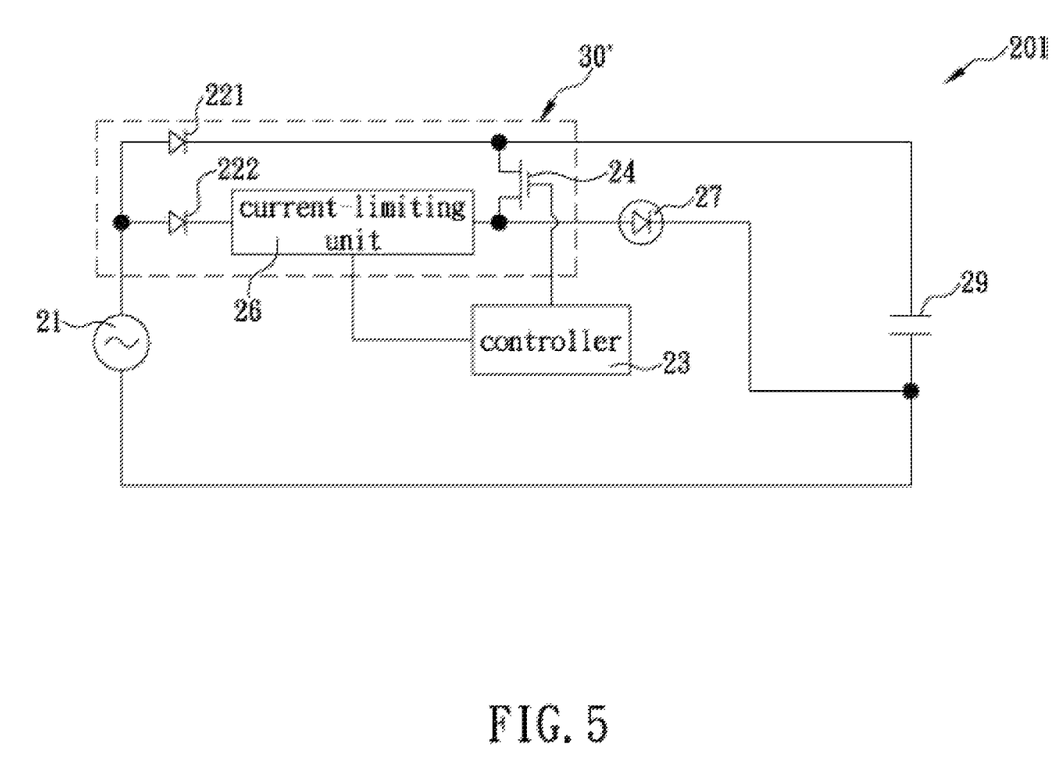
FIG. 5 schematically shows the circuit structure of the LED driver circuit according to another embodiment of the present invention.

In the aforesaid embodiment, control is carried out through voltage detection. In practice, however, control may be carried out through current detection as well. Referring to FIG. 5 for a schematic circuit diagram of the LED driver circuit 201 according to the second preferred embodiment of the present invention, the controller 23 in the LED driver circuit 201 has its input end connected to the switch device 30' so as to detect a load current in the switch device 30'. When determining that the load current is higher than a rated current value, the controller 23 drives the switch device 30' to make the connection between the power source 21 and the capacitor 29 and the connection between the power source 21 and the LED 27; as a result, the power source 21 charges the capacitor 29 while driving the LED 27 to emit light. When determining that the load current is lower than the rated current value, the controller 23 drives the switch device 30' to make only the connection between the capacitor 29 and the LED 27, thus allowing the capacitor 29 to drive the LED 27 to emit light.

Compared with its counterpart in the embodiment shown in FIG. 4, the switch device 30' of the LED driver circuit 201 in the second preferred embodiment includes a current-limiting unit 26 (e.g., a current-limiting switch or a resistor) in addition to the first diode 221, the second diode 222, and the transistor switch 24. The current-limiting unit 26 has one end connected to the negative electrode of the second diode 222. When a current flows through the current-limiting unit 26, the current-limiting unit 26 generates the aforesaid load current and provides the load current to the input end of the controller 23. The input end and the output end of the transistor switch 24 are respectively connected to the negative electrode of the first diode 221 and another end of the current-limiting unit 26, and the control end of the transistor switch 24 is connected to the output end of the controller 23. When the controller 23 determines that the load current is higher than a rated current value, meaning the input voltage currently generated by the power source 21 is high enough to drive the LED 27 to emit light, the controller 23 generates the first control signal. When the load current is lower than the rated current value, meaning the input voltage currently generated by the power source 21 is not high enough to drive the LED 27 to emit light, the controller 23 generates the second control signal instead.

Continued from the above, the transistor switch 24 cuts off the current between its input end and output end upon receiving the first control signal and allows passage of current between its input end and output end upon receiving the second control signal. Thus, by means of switch control, the LED 27 can be driven to emit light continuously as in the previous embodiment.

Figure 6:
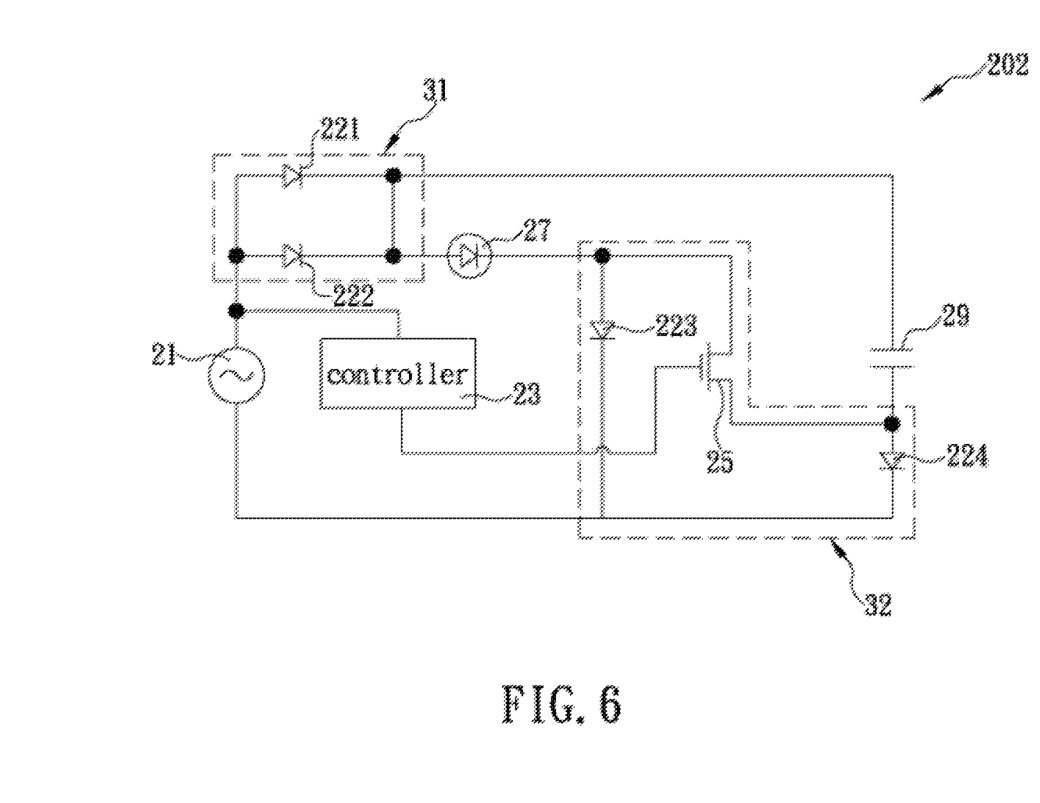
FIG. 6 schematically shows the circuit structure of the LED driver circuit according to yet another embodiment of the present invention.

FIG. 6 is a schematic circuit diagram of the LED driver circuit according to the third preferred embodiment of the present invention. As shown in the drawing, the LED driver circuit 202 in this embodiment includes a power source 21, a controller 23, a first switch device 31, a second switch device 32, at least one LED 27, and a capacitor 29. The positive electrode of the capacitor 29 and the positive electrode of the LED 27 are respectively connected to the positive electrode of the power source 21 via the first switch device 31. The first switch device 31 is configured to prevent the discharge current of the capacitor 29 from flowing back to the power source 21 and to ensure that the discharge current flows to the LED 27. The negative electrode of the capacitor 29 and the negative electrode of the LED 27 are respectively connected to the negative electrode of the power source 21 via the second switch device 32.

As shown in FIG. 6, the input end of the controller 23 is connected to a line between the first switch device 31 and the positive electrode of the power source 21, so as for the controller 23 to detect an input voltage provided by the power source 21. Upon detecting that the input voltage is higher than the forward bias voltage of the LED 27, the controller 23 generates a first control signal and sends the first control signal to the second switch device 32 through the output end of the controller 23, causing the second switch device 32 to make the connection between the power source 21 and the capacitor 29 and the connection between the power source 21 and the LED 27. Consequently, the input voltage not only drives the LED 27 to emit light, but also charges the capacitor 29 at the same time.

Conversely, upon determining that the input voltage is lower than the forward bias voltage of the LED 27, the controller 23 generates a second control signal and sends the second control signal to the second switch device 32 through the output end of the controller 23, causing the second switch device 32 to make only the connection between the capacitor 29 and the LED 27. Thus, the energy stored in the capacitor 29 is discharged to the LED 27 and drives the LED 27 to emit light.

Referring again to FIG. 6, the first switch device 31 in this embodiment includes a first diode 221 and a second diode 222. The first diode 221 has its positive electrode connected to the positive electrode of the power source 21 and its negative electrode connected to the positive electrode of the capacitor 29. The second diode 222 has its positive electrode connected to the positive electrode of the power source 21 and its negative electrode connected to the positive electrode of the capacitor 29 and to the positive electrode of the LED 27. The second switch device 32 includes a third diode 223, a fourth diode 224, and a transistor switch 25.

The third diode 223 has its positive electrode connected to the negative electrode of the LED 27 and its negative electrode connected to the negative electrode of the power source 21. The fourth diode 224 has its positive electrode connected to the negative electrode of the capacitor 29 and its negative electrode connected to the negative electrode of the power source 21. The transistor switch 25 has its input end and output end respectively connected to the negative electrode of the LED 27 and the positive electrode of the fourth diode 224 and its control end connected to the output end of the controller 23. When the control end of the transistor switch 25 receives the first control signal, the transistor switch 25 cuts off the current between its input end and output end. When the control end of the transistor switch 25 receives the second control signal, the transistor switch 25 allows passage of current between its input end and output end.

Figure 7:
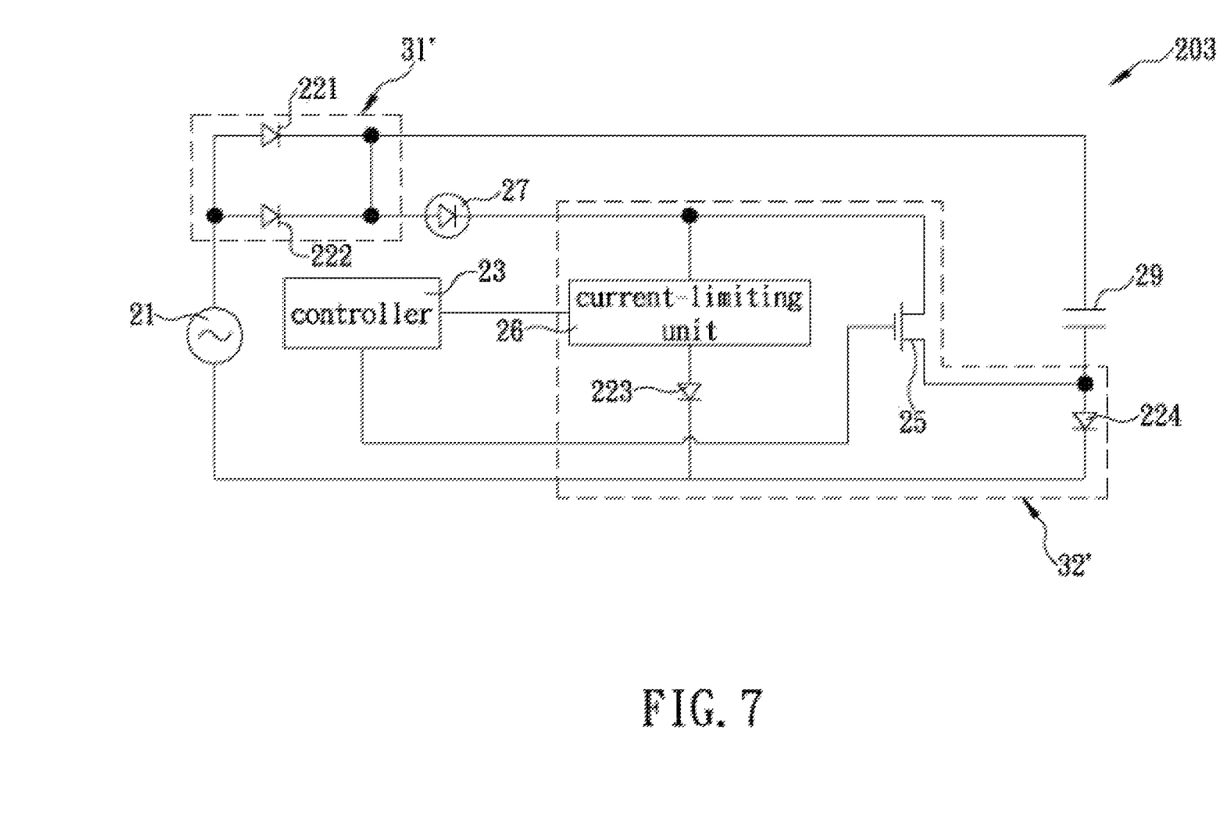
FIG. 7 schematically shows the circuit structure of the LED driver circuit according to still another embodiment of the present invention.

Please refer to FIG. 7 for a schematic circuit diagram of the LED driver circuit 203 according to the fourth preferred embodiment of the present invention. The LED driver circuit 203 includes a power source 21, a controller 23, a first switch device 31', a second switch device 32', an LED 27, and a capacitor 29. The positive electrode of the capacitor 29 and the positive electrode of the LED 27 are respectively connected to the positive electrode of the power source 21 through the first switch device 31'. The first switch device 31' is configured to prevent the discharge current of the capacitor 29 from flowing back to the power source 21 and to ensure that the discharge current flows to the LED 27.

Continued from the above, the negative electrode of the capacitor 29 and the negative electrode of the LED 27 are respectively connected to the negative electrode of the power source 21 through the second switch device 32'. The input end of the controller 23 is connected to the second switch device 32' in order for the controller 23 to detect a load current in the second switch device 32'. When the controller 23 determines that the load current is higher than a rated current value, meaning the input voltage currently generated by the power source 21 is high enough to drive the LED 27 to emit light, the controller 23 generates a first control signal and thereby drives the second switch device 32' to make the connection between the power source 21 and the capacitor 29 and the connection between the power source 21 and the LED 27. As a result, the power source 21 charges the capacitor 29 while driving the LED 27 to emit light.

Conversely, when the controller 23 determines that the load current is lower than the rated current value, meaning the voltage currently generated by the power source 21 is not high enough to drive the LED 27 to emit light, the controller 23 generates a second control signal and sends the second control signal to the second switch device 32' through the output end of the controller 23, causing the second switch device 32' to make only the connection between the capacitor 29 and the LED 27, such that the LED 27 is driven to emit light by the discharge voltage of the capacitor 29.

Referring again to FIG. 7, the first switch device 31' in this embodiment includes a first diode 221 and a second diode 222. The first diode 221 has its positive electrode connected to the positive electrode of the power source 21 and its negative electrode connected to the positive electrode of the capacitor 29. The second diode 222 has its positive electrode connected to the positive electrode of the power source 21 and its negative electrode connected to the positive electrode of the capacitor 29 and to the positive electrode of the LED 27. The second switch device 32' includes a current-limiting unit 26, a third diode 223, a fourth diode 224, and a transistor switch 25.

The current-limiting unit 26 has one end connected to the negative electrode of the LED 27. When a current flows through the current-limiting unit 26, the current-limiting unit 26 generates the load current and provides the load current to the input end of the controller 23. The third diode 223 has its positive electrode connected to another end of the current-limiting unit 26 and its negative electrode connected to the negative electrode of the power source 21. The fourth diode 224 has its positive electrode connected to the negative electrode of the capacitor 29 and its negative electrode connected to the negative electrode of the power source 21. The input end and the output end of the transistor switch 25 are connected to the negative electrode of the LED 27 and the positive electrode of the fourth diode 224 respectively while the control end of the transistor switch 25 is connected to the output end of the controller 23. When the control end receives the first control signal, the transistor switch 25 cuts off the current between its input end and output end. When the control end receives the second control signal, the transistor switch 25 allows passage of current between its input end and output end. Thus, by means of current detection, the same effect as achievable by the previous embodiment can be obtained.

In a nutshell, the LED driver circuits 200, 201, 202, and 203 of the present invention are so designed that the capacitor 29 will not be discharged to drive the LED 27 unless the power source 21 is at a relatively low potential level. Hence, it is feasible to use a small-capacity, low-cost capacitor as the capacitor 29 to both effectively increase the light emission time of the LED 27 and lower the production costs of the LED driver circuits 200, 201, 202, and 203.

While the invention herein disclosed has been described by means of specific embodiments, numerous modifications and variations could be made thereto by those skilled in the art without departing from the scope of the invention set forth in the claims.

What is claimed is:

1. A light-emitting diode (LED) driver circuit, comprising:
   at least an LED;
   a capacitor;
   a switch device through which the capacitor and the at least an LED are respectively connected in parallel to a power source; and
   a controller having an input end connected to the switch device, so as for the controller to detect a load current in the switch device, wherein upon determining that the load current is higher than a rated current value, the controller generates a first control signal and sends the first control signal to the switch device through an output end of the controller, causing the switch device to make a connection between the power source and the capacitor and a connection between the power source and the at least an LED, such that an input voltage provided by the power source not only drives the at least an LED to emit light, but also charges the capacitor simultaneously; and wherein upon determining that the load current is lower than the rated current value, the controller generates a second control signal and sends the second control signal to the switch device through the output end, causing the switch device to make only a connection between the capacitor and the at least an LED, such that a discharge voltage of the capacitor drives the at least an LED to emit light.

2. The LED driver circuit of claim 1, wherein the switch device comprises:
   a first diode having a positive electrode connected to a positive electrode of the power source;
   a second diode having a positive electrode connected to the positive electrode of the power source;
   a current-limiting unit having an end connected to a negative electrode of the second diode, wherein when a current flows through the current-limiting unit, the current-limiting unit generates the load current and provides the load current to the input end of the controller; and
   a transistor switch having an input end and an output end respectively connected to a negative electrode of the first diode and another end of the current-limiting unit, the transistor switch further having a control end connected to the output end of the controller, wherein when the control end receives the first control signal, the transistor switch cuts off a current between the input end and the output end of the transistor switch, and when the control end receives the second control signal, the transistor switch allows passage of current between the input end and the output end of the transistor switch.

3. The LED driver circuit of claim 2, wherein the current-limiting unit is a current-limiting switch or a resistor.

* * * * *